(12) United States Patent
Borrego et al.

(10) Patent No.: US 6,636,779 B2
(45) Date of Patent: Oct. 21, 2003

(54) TAPE LIBRARY MIRRORED REDUNDANT CONTROLLERS

(75) Inventors: Antonio Borrego, Superior, CO (US); Steven Ochs, Louisville, CO (US); Don Wait, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 145 days.

(21) Appl. No.: 10/003,456

(22) Filed: Oct. 26, 2001

(65) Prior Publication Data

US 2003/0083782 A1 May 1, 2003

(51) Int. Cl.⁷ .................................................. G06F 7/00
(52) U.S. Cl. ......................... 700/214; 700/20; 700/247
(58) Field of Search ................................. 700/213, 214, 700/218, 245, 247, 1, 3, 4, 20

(56) References Cited

U.S. PATENT DOCUMENTS

| | | | | |
|---|---|---|---|---|
| 5,848,230 A | * | 12/1998 | Walker | 714/7 |
| 5,870,537 A | * | 2/1999 | Kern et al. | 714/6 |
| 6,262,863 B1 | * | 7/2001 | Ostwald et al. | 360/92 |
| 6,304,980 B1 | * | 10/2001 | Beardsley et al. | 714/6 |
| 6,415,418 B1 | * | 7/2002 | McLaughlin et al. | 716/3 |
| 6,430,472 B1 | * | 8/2002 | Boillot et al. | 700/245 |

* cited by examiner

*Primary Examiner*—Khoi H. Tran
(74) *Attorney, Agent, or Firm*—Carstens, Yee & Cahoon, LLP

(57) ABSTRACT

The present invention provides two redundant tape library controllers that mirror each other's function. A secondary controller can immediately take over from the primary controller if the primary unit fails or if a redundant path leading to the primary controller fails.

18 Claims, 10 Drawing Sheets

FIG. 3
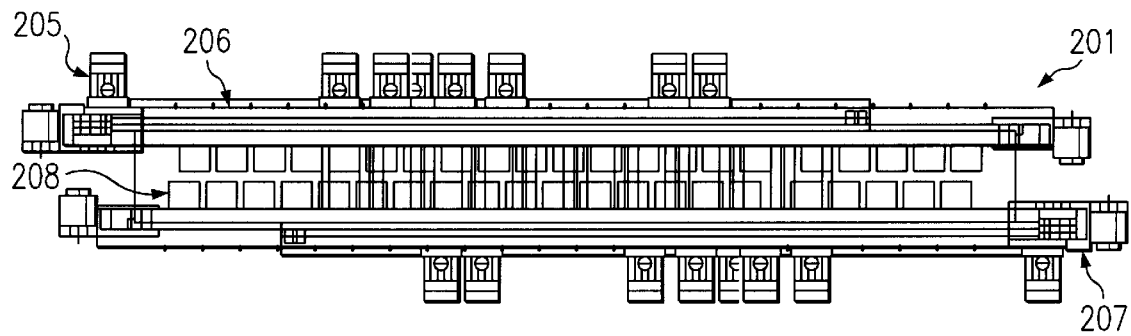
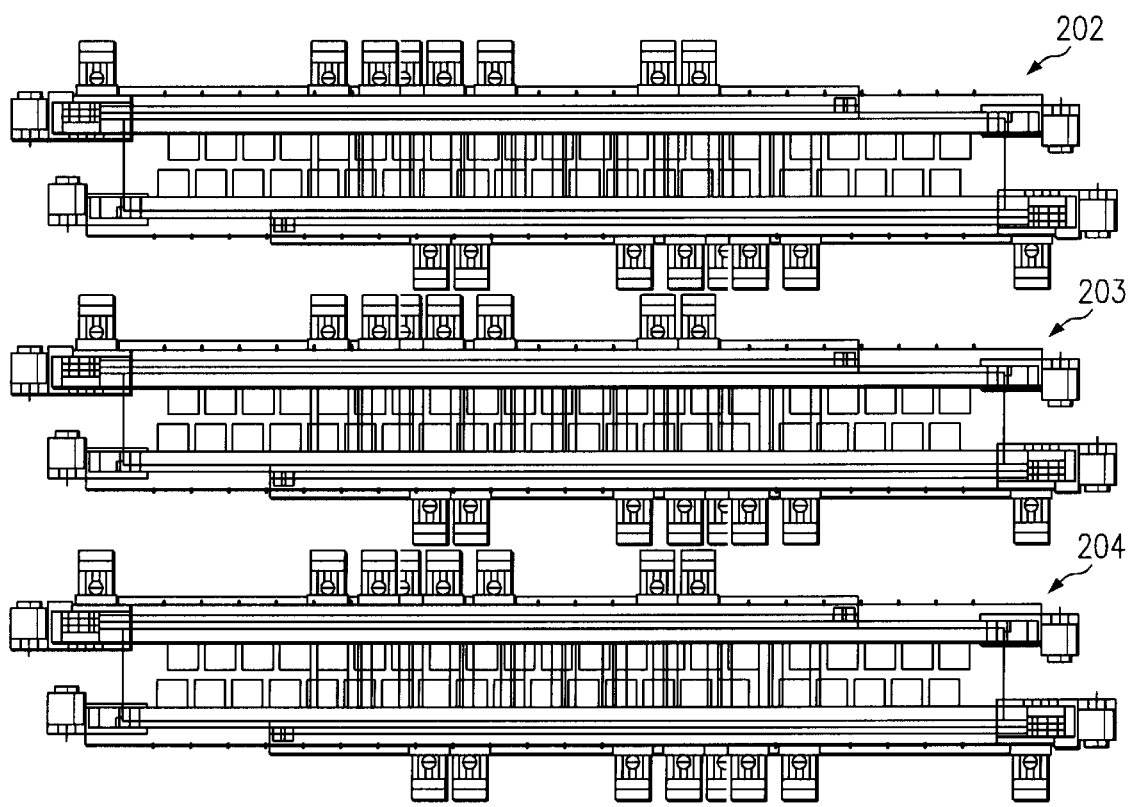

TAPE LIBRARY MIRRORED REDUNDANT CONTROLLERS

BACKGROUND OF THE INVENTION

1. Field of the Invention

The present invention relates generally to robotic media storage library systems, and more specifically to a redundant system that includes a plurality of independent robots in the form of robotic pods.

2. Background of the Invention

The current enterprise class library system contains multiple independent robots for concurrently manipulating multiple media cartridges. The library system comprises an array of media storage cells and media cartridge players. A system of rails is used to guide robotic pods through all of the locations on the array.

The current enterprise class library has a few redundant features, such as the Hand and the Hand Servo Controller. However, it still has many potential single points of failure in the robotics electrical components (i.e. main controller, interrupt controller, etc.). If a failure occurs in one of these components, it may make the unit non-operational. Currently, there is a customer demand for high availability (99.999% run time) on enterprise class tape automated libraries, which requires minimum system down time due to individual component failures.

Therefore, it would be desirable to have a method for providing redundant controllers that mirror each others' function and can immediately take over if the primary control units fails.

SUMMARY OF THE INVENTION

The present invention provides two redundant tape library controllers that mirror each other's function. A secondary controller can immediately take over from the primary controller if the primary unit fails or if a redundant path leading to the primary controller fails.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a top view pictorial diagram illustrating the same modules illustrated in FIG. 2;

DETAILED DESCRIPTION OF THE PREFERRED EMBODIMENT

Figure 1:
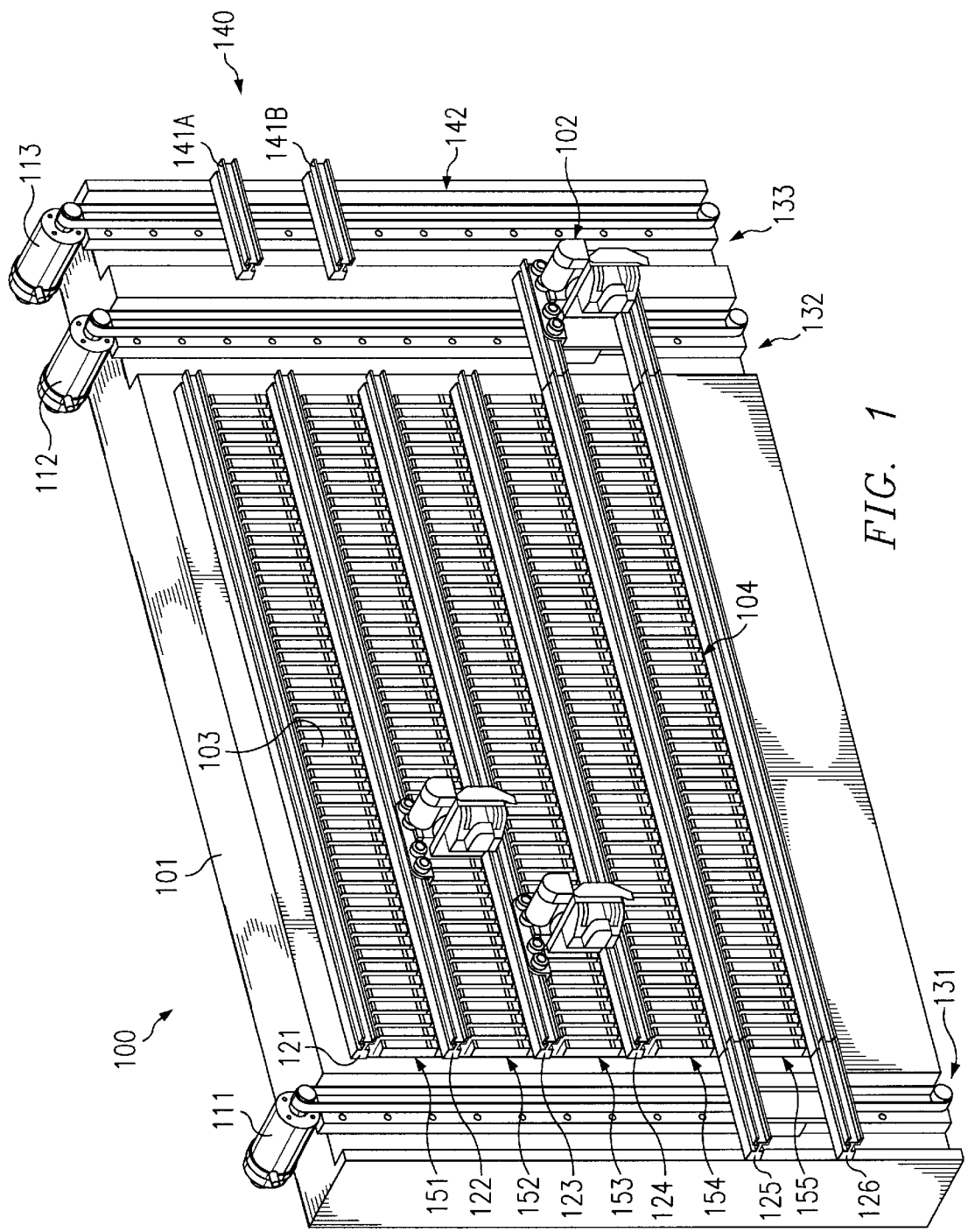
FIG. 1 depicts a perspective pictorial diagram illustrating the architecture of a single library storage module in accordance with the present invention.

The architecture of the present automated library system 100 is illustrated in FIG. 1 and contains the multiple independent robots 102 to enable the library system 100 to concurrently manipulate multiple media cartridges 105. The library system 100 comprises a two-dimensional array of media cartridge storage cells 103 and media cartridge players 104 that are mounted in a frame 101. A system of rails 121–126 is used to guide robotic pods 102 through all of the locations in the array, which eliminates the need for any steering or guide mechanisms on board the robotic pods 102, resulting in a reduction in the mass of the robotic pods 102. The rail system 121–126 also constrains the movement of the robotic pods 102 into horizontal and vertical movements, thereby simplifying the control algorithms for collision avoidance that are required by a typical random moveable object handling system based on horizontal, vertical and diagonal degrees of freedom. The robotic pods 102 contain a moveable carriage that is capable of transporting robotic components, such as media cartridge pickers, bar code reading devices, and other task oriented sub-modules, on the storage library rail system.

As shown in FIG. 1, the frame 101 is designed to receive a plurality of rows 151–154 of media cartridge storage cells 103, each of which is designed to house a single media cartridge 105. The media cartridge players 104 are shown in an arbitrary location in a horizontal row 155 at the bottom of the frame 101, although the library system 100 can incorporate media cartridge players 104 at any location in the frame 101 to optimize performance. The robotic pods 102 are attached to the frame 101 via horizontal guide rails 121–126, which serve to frame the media cartridge storage cells 103 and media cartridge players 104 on the top and bottom sides thereof. FIG. 1 shows an array of media storage cells 103 fully populated with media cartridges 105 of any arbitrary type. The robotic pod guide rails 121–126 provide support of the robotic pods 102 in the vertical direction to oppose the force of gravity, and they also provide a meshing surface of suitable design to impart traction in the horizontal direction for motive transport of the robotic pods 102. The robotic pods 102 each incorporate a drive means for propulsion in the horizontal direction along the guide rails 121.

FIG. 1 also shows a plurality of vertical elevator assemblies 131–133 that enable the transfer of the robotic pods 102 in the vertical direction. Multiple vertical elevator assemblies 131–133 are shown in FIG. 1 to exemplify the extensibility and redundancy of the invention. Each of the vertical elevator assemblies 131–133 comprise a set of vertical rails 142 that extend substantially from the top of the frame 101 to the bottom of the frame 101. The vertical rails 142 support a plurality of elevator stations 140, each of which contain short horizontal rail segments 141A, 141B that are identical in cross section to the main horizontal guide rails 121–126. The elevator stations 140 are held in suspension by a drive belt 143 which is made to wrap around a drive pulley attached to a vertical drive motor 113 that is located at the top of each elevator assembly 133. When a vertical displacement is required of any robotic pod 102, the vertical elevator 140 is scheduled to move in alignment to the appropriate level of rows 151–155 to allow transfer of the robotic pod 102 onto the elevator rail section 141A, 141B from the pair of horizontal rails 121–126 that are juxtaposed and abutting to the elevator rails 141A, 141B. Once the robotic pod 102 is located on the elevator station 140, the drive motor 113 is activated to transport the robotic pod 102 to a selected one of rows 151–155 and thence moves on to the pair of horizontal rails 121–126 that correspond to the selected row. Elevator assemblies 131–133 can carry more than one robotic pod 102 at a time by adding elevator platforms 140 to the elevator assemblies 131–133 or by extending the elevator platform length to accommodate multiple robotic pods 102 on a single elevator station 140.

Figure 2:
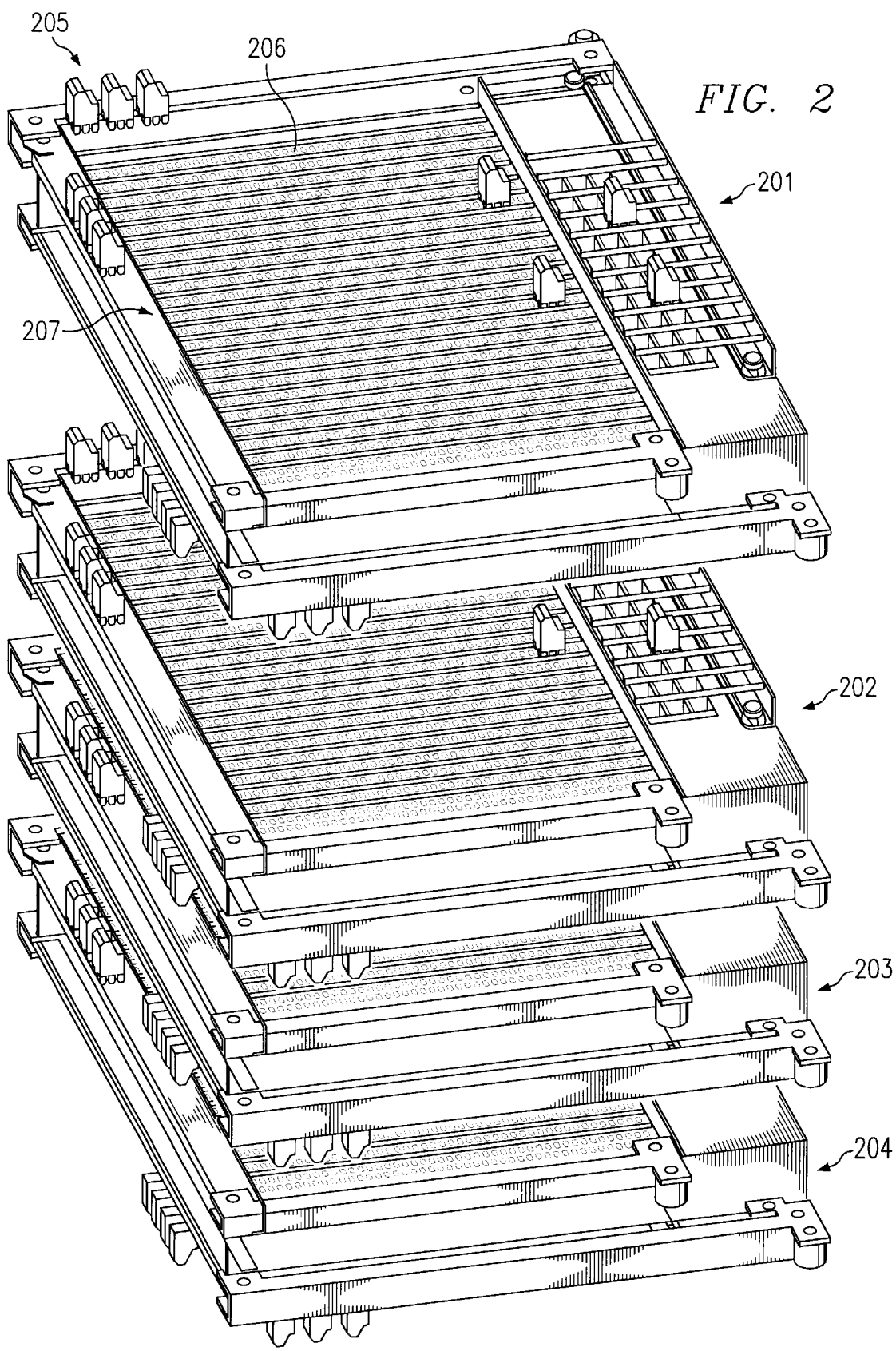
FIG. 2 depicts a perspective view pictorial diagram illustrating four modules of a removable-unit storage network in accordance with the present invention.

Referring now to FIG. 2, a perspective view pictorial diagram illustrating four modules of a storage library network is depicted in accordance with the present invention. Removable units can be individual units of media such as, for example, a tape cartridge, a magazine of cartridges, or more complex units such as individual disk drives. FIG. 3 depicts a top view pictorial diagram illustrating the same modules illustrated in FIG. 2. Similar to the library unit illustrated in FIG. 1, each module 201–204 has several robotic hands, for example robot 205, which are capable of retrieving object from storage cells 208 within the modules 201–204. The robotic hands move along rows of tracks 206 and can be moved between rows of tracks by means of an elevator mechanism 207. As can be seen in FIG. 3, all of the features described can be placed on both sides of the storage modules 201–204. The modules 201–204 are identical to each other and can be used separately or in combination, according to the user's needs. It is this modular feature that gives the present invention much of its flexibility and adaptability to different requirements. Note that the unused space is configured between modules 201 and 202 while the rest of the modules only have enough space to allow robotic hands to safely pass each other.

Figure 4:
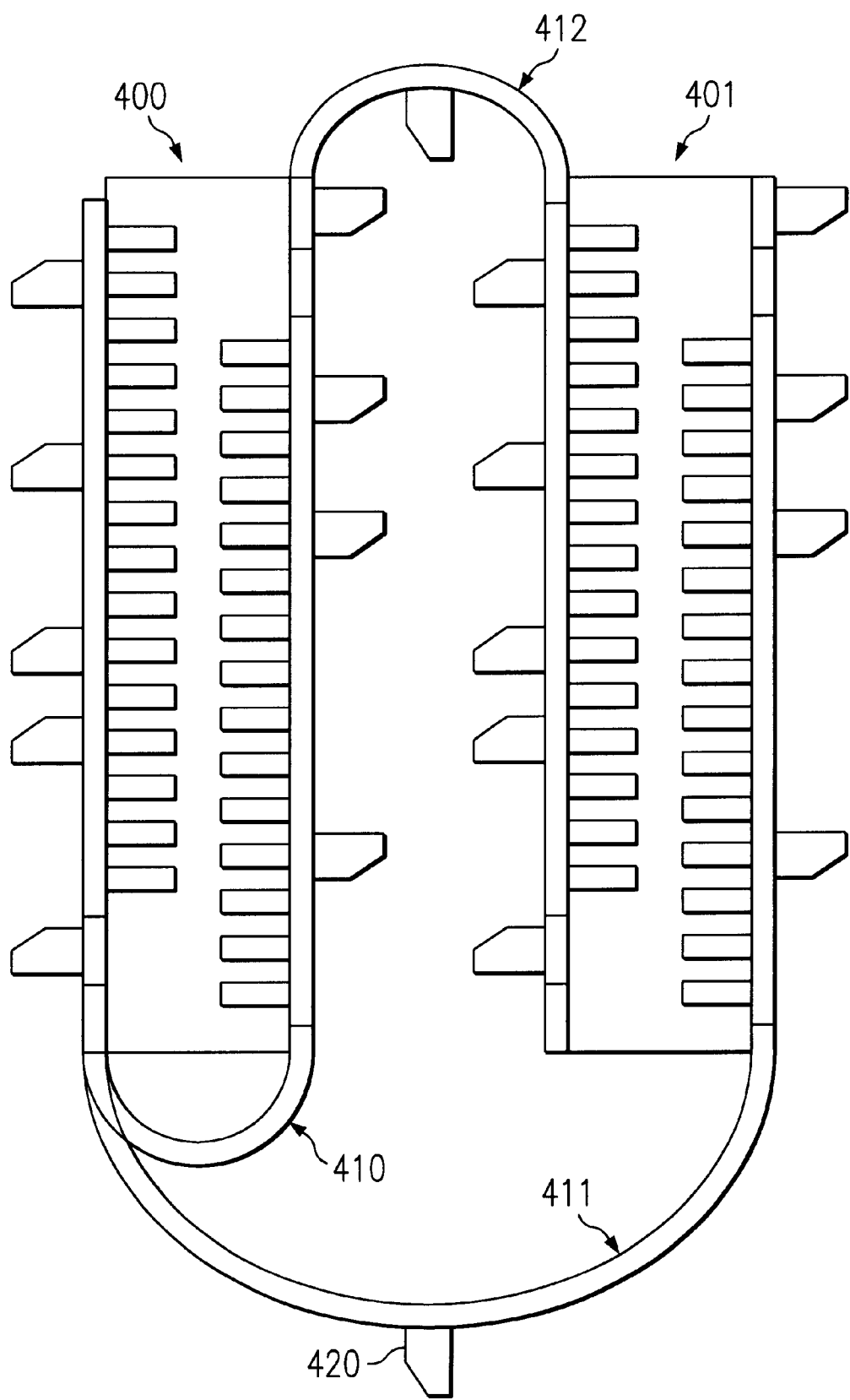
FIG. 4 depicts a schematic diagram illustrating the top view of two library storage modules linked by robot-track bridges in accordance with the present invention.

Referring to FIG. 4, a schematic diagram illustrating the top view of two library storage modules linked by robot-track bridges is depicted in accordance with the present invention. Library modules 400 and 401 are similar to the modules depicted in FIGS. 1, 2 and 3. The track bridges 410, 411, and 412 allow robotic retrievers, such as robot 420, to move from one side of a module to another, or to move between modules. For example, track bridge 410 allows robots to move between the inside and outside robot tracks of library module 400. Track bridge 411 allows robots to move between the respective outside robot tracks of modules 400 and 401. Track bridge 412 allows robots to move between the respective inside tracks of modules 400 and 401.

The robot track bridges, such as those illustrated in FIG. 4, help integrate banks of library modules, such as the bank illustrated in FIGS. 2 and 3. Track bridges may be connected to library modules at different track levels and may be dynamically connected and disconnected from the modules during the course of operations.

Figure 5:
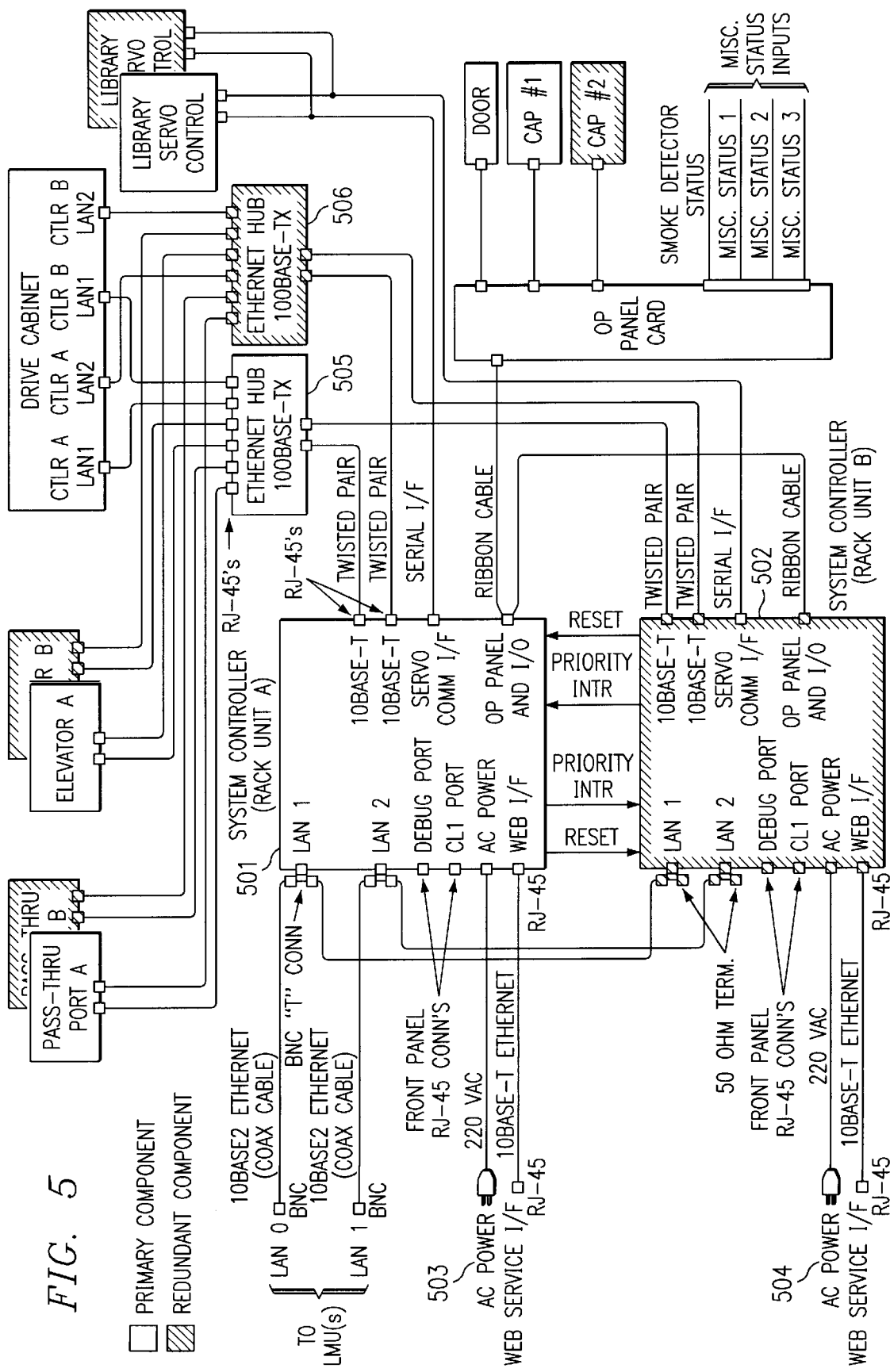
FIG. 5 depicts a schematic diagram illustrating the architecture of tape library mirrored redundant controllers in accordance with the present invention.

Referring to FIG. 5, a schematic diagram illustrating the architecture of tape library mirrored redundant controllers is depicted in accordance with the present invention. The present invention provides two completely redundant tape library controllers 501 and 502 that mirror each other's function. A secondary controller 502 can immediately take over from the primary controller 501 if the primary unit fails or if a redundant path leading to the primary controller 501 fails. This assumes that there are redundant components attached to the primary and secondary tape library controllers 501 and 502, such as power supplies 503 and 504, dual communication channels 505 and 506 (i.e. Ethernet, Fibre, etc.), and redundant robotic devices. It further implies that software execution on the primary and secondary units are running in tandem and monitoring each other such that the primary unit executes all input/output (I/O) for the robotic devices while the secondary unit listens to all I/O. This allows virtually uninterrupted service on the tape library, as well as transparent servicing of the failed component(s).

Figure 6:
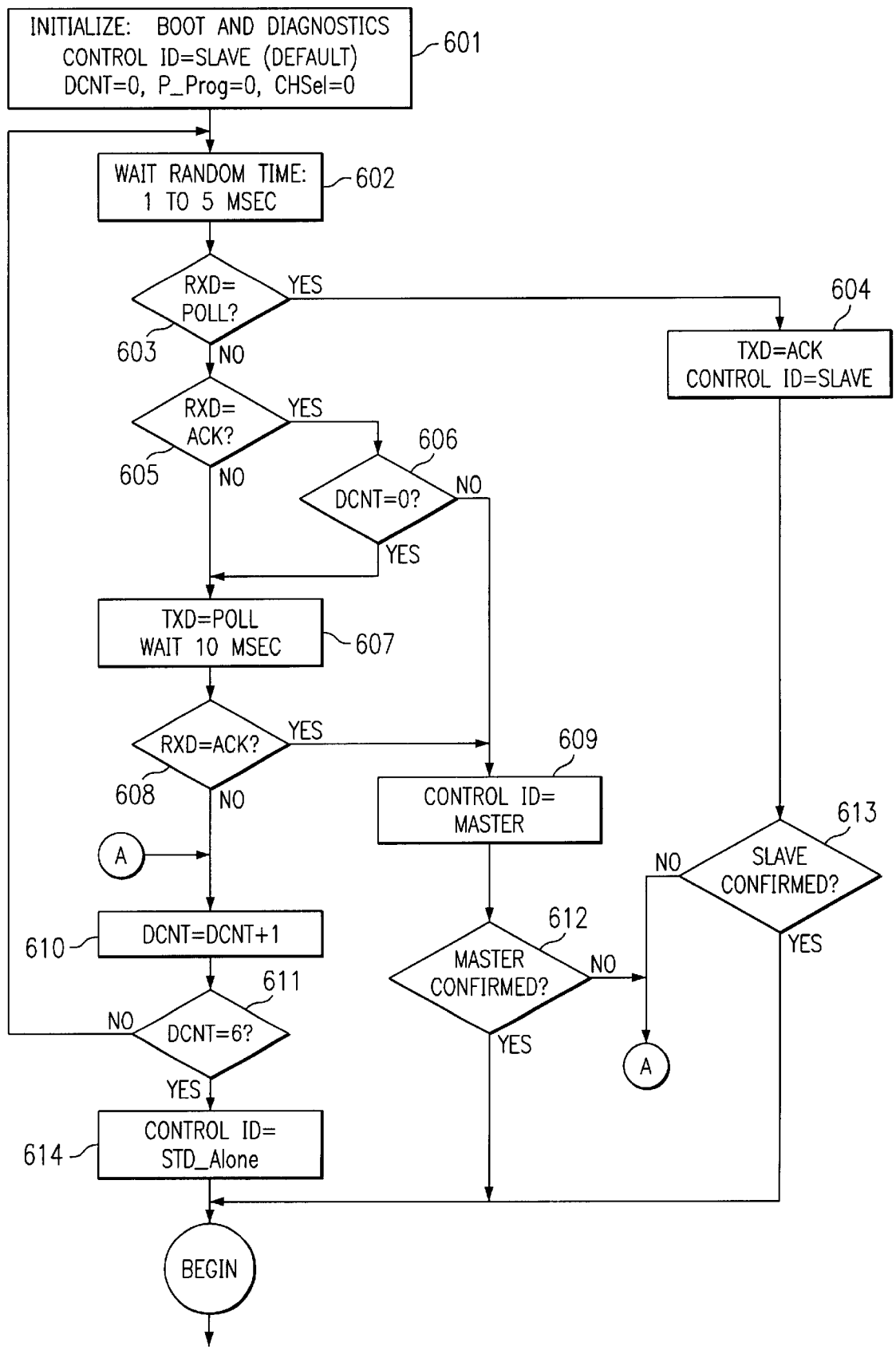
FIG. 6 depicts a flowchart illustrating the process of initializing mirrored redundant controller boards in accordance with the present invention.

Referring to FIG. 6, a flowchart illustrating the process of initializing mirrored redundant controller boards is depicted in accordance with the present invention. Each respective controller board is running identical software code, and will come up in either master, slave or stand-alone mode. A master controller will normally be issuing all active I/O and polling the slave via the Ethernet channels. The slave will normally be "listening" to all active I/O. However, the slave will not issue any output other than an acknowledgement to the master. A board that comes up in stand-alone mode will normally poll for a companion board (slave), and will assert itself as a master if it detects another board.

The initialization begins by booting and running diagnostics (step 601). The default control ID for all processors is slave. The discover time count (DCNT), which denotes the number of iterations through the cycle, is set at 0, as are the poll progress (P_Prog), channel selctions (CHSel), channel 0 discount (CH0_Disc), channel 1 discount (CH1_Disc), channel 0 error count (CH0_ECNT), channel 1 error count (CH1_ECNT), and acknowledgement count (ACK_CNT). If there is a diagnostics error, the program will halt the diagnostics.

The processor then waits for a randomly selected time (i.e. 1 to 5 msec) (step 602). The purpose of the random wait time is to desynchronize the start up of separate processors, thus allowing one of the boards to become the master controller.

The input Ethernet port is checked to determine if a poll has been received from another processor (step 603). Both Ethernet channels are checked. If a poll has been received, it means another processor has assumed master status. In this case an acknowledge message is sent to the master controller, and the control ID is set to slave (step 604). The processor then confirms its slave status (step 613). If the confirmation is positive, the processor begins running in slave mode (described in detail below). If slave status cannot be confirmed, the processor adds a count to the DCNT value (step 610), and then determines the total number of iterations that have been completed through the initialization cycle (step 611). For example, a maximum number of iterations may be preset (e.g., 6), if the DCNT determined in step 611 has not yet reached this preset number, the process returns to step 602 and begins again. If the preset number of iterations has been reached, the control ID is set to stand-alone mode (step 614), and the processor proceeds to running in stand-alone mode (explained in detail below).

Returning to step 603, if a poll has not been received by either Ethernet receive ports, the processor checks both input channels to determine if any acknowledge messages have been received from another processor (step 605). The only way that an acknowledge message will be received is if the other processor has gone through the slave mode initialization path described above.

If an acknowledge message has been received, the processor determines if the DCNT is equal to 0 (the first pass) (step 606). If the DCNT is equal to 0, the processor confirms the acknowledge message by polling the other device (step 607).

If the DCNT is not 0, the control ID is set to master (step 609), and master status is confirmed (step 612). If the confirmation is positive, the processor begins running in master mode (described in detail below). If master status cannot be confirmed, a count is added to the DCNT value (step 610) and the total DCNT is determined (step 611). If the preset number of iterations has not been reached, the initialization cycle is repeated (return to step 602). If the preset number of iterations has been reached, the control ID is set to stand-alone (step 614), and the processor begins running in stand-alone mode (described in detail below).

Returning to step 605, if an acknowledge message has not been received by either receive ports, the processor send out a poll and waits a predetermined time (step 607). The wait time in step 607 might be twice the random wait time used in step 602. The purpose of the wait time is to account for the desynchronized start-up between the separate controllers produced in step 602.

After sending the poll, the receive ports are checked for an acknowledge message (step 608). If an acknowledge message is received, the control ID is set to master (step 609) and the processor proceeds to step 612 as described above. If an acknowledge message is not received, the processor updates the DCNT (step 610) and proceeds to step 611 as described above.

Figure 7A:
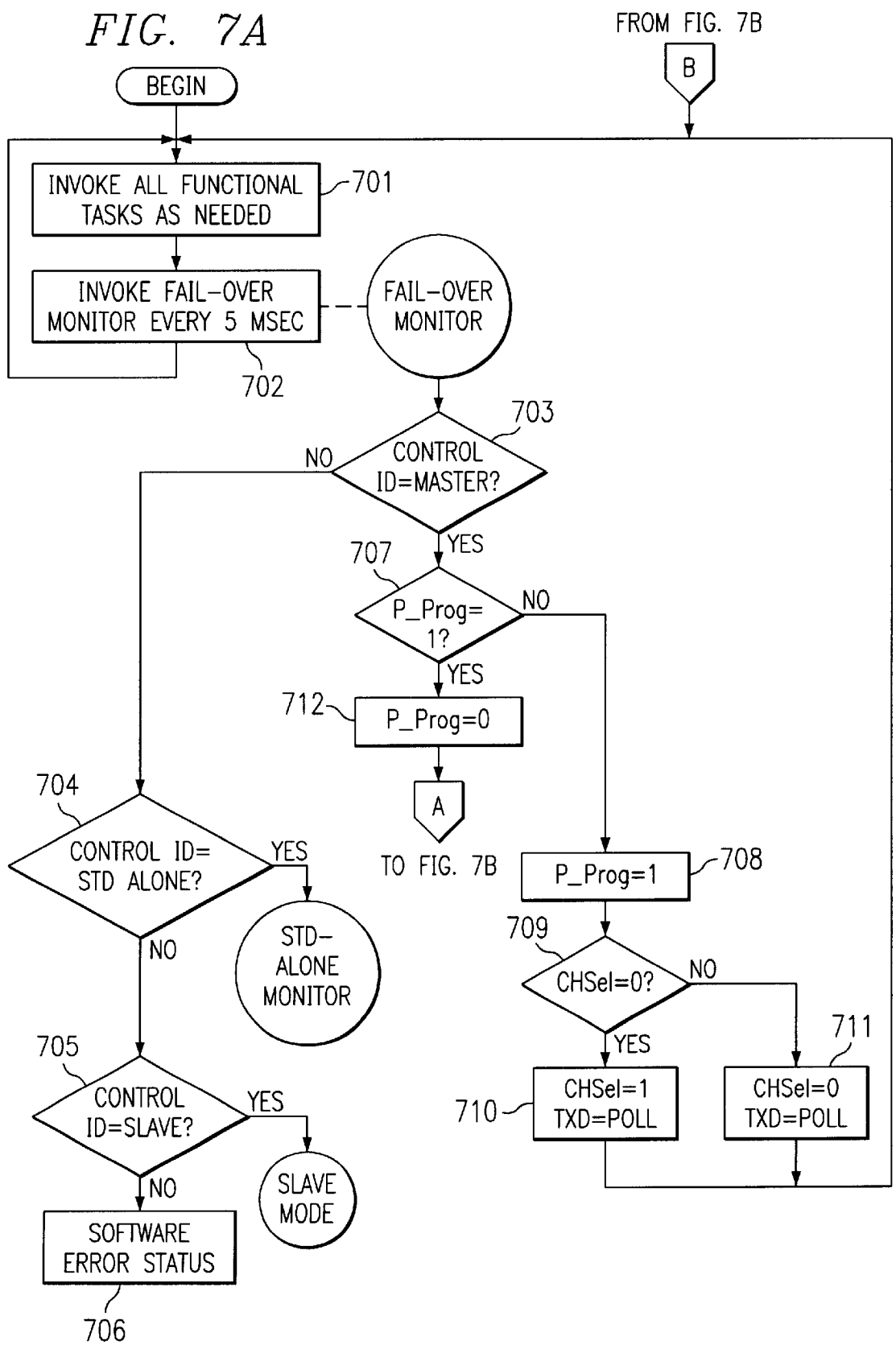
FIG. 7 depicts a flowchart illustrating the operation of a processor in master mode in accordance with the present invention.
Figure 7B:
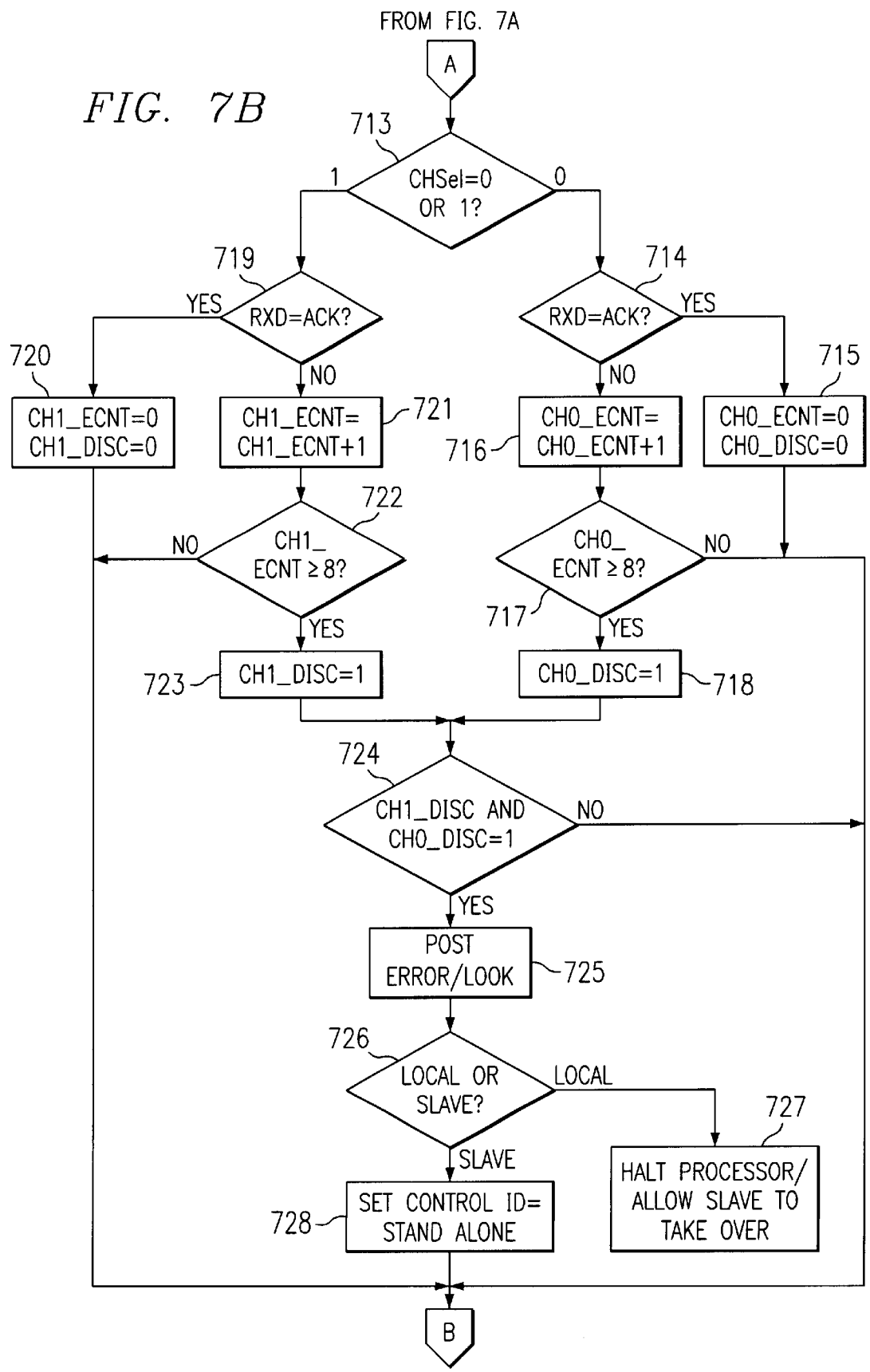

Referring to FIG. 7, a flowchart illustrating the operation of a processor in master mode is depicted in accordance with the present invention. The process begins where FIG. 6 leaves off. The processor invokes all functions as needed (step 701). One of these functions is the fail-over monitor, which is invoked at set intervals (e.g., every 5 msec) (step 702). When the fail-over monitor is invoked, the control ID is checked to see if it is still set to master mode (step 703). If the control ID is not set to master, the processor then determines if the control ID is set to stand-alone mode (step 704). If so, then the processor changes over to running in stand-alone mode (described below). If the control ID is not set for stand-alone, the processor must then determine if the control ID is set to slave mode (step 705). If the control ID is set to slave mode, then the processor switches over to running in slave mode (described below). If the control ID is not set to slave mode, a software error status is registered (step 706).

Returning to step 703, if the control ID is still set to master mode, the processor determines if the poll progress (P_Prog) value is set to 1 (step 707). A P_Prog value of 1 means that a poll message has been sent to the other processor. If the P-Prog value is not 1, then the processor sets the P_Prog value to 1 and proceeds to poll the other processor (step 708). When sending out poll messages, the processor will normally alternate between the first and second Ethernet channels. The processor determines if the channel select (CHSel) is set to channel 0 (step 709). If it is, then the channel select is set to channel 1 and a poll output message is sent to the other processor (step 710). The next time the processor returns to step 709, the channel select will be switched to channel 0 when sending out the poll message (step 711).

Returning to step 707, if the P_Prog value is already set to 1, then a poll message has already been sent. Therefore, the P_Prog value is set to 0 (step 712).

The processor then determines if the channel select has been set to Ethernet channel 0 or 1 (step 713). If the channel select is set to Ethernet channel 0, that channel is checked for an incoming acknowledge message from the other processor (step 714). If an acknowledge is received from the other processor, the channel 0 error count (CH0_ECNT) and channel 0 discount (CH0_DISC) are left at 0, and the process returns to the beginning, step 701. This means that everything is running normally. However, if an acknowledge message is not received from the other processor, the channel 0 error count is increased by a value of 1 (step 716). The processor then determines if a preset maximum error count has been reached (e.g., 8 errors) (step 717). If the preset maximum has not been reached, the process returns to the beginning (step 701), and begins a new cycle. However, if the maximum number of errors has been recorded, the channel 0 discount value (CH0_DISC) is set to 1 (step 718).

Returning to step 713, if the channel select is set to Ethernet channel 1, the same process is applied as in the case of channel 0. Channel 1 is checked for a received acknowledge from the other processor (step 719). If the acknowledge is received, the error count and channel 1 discount values are left unchanged (step 720) and the system returns to step 701. If no acknowledge is received, the channel 1 error count is increased by a value of 1 (step 721), and the current count is then compared to the preset maximum (step 722). If the maximum has not been reached, the process returns to the beginning (step 701). If the maximum error count has been reached, the channel 1 discount value is set to 1 (step 723).

If the channel discount value for either channel is set to 1 (in step 718 or 723), the processor determines if both channels have been discounted (step 724). If not, the process returns to step 701 and continues to run on the single working channel. However, if both channel 0 and channel 1 have been discounted, the processor posts an error (step 725) and determines if the problem is local to one of the master processor's communication channels or if the problem is with the other (slave) processor (step 726). If the problem is local, then the master processor will halt and allow the slave processor to take over (step 727). If the slave system takes over as the new master, the failed master program will go back to the initialization and boot procedure in FIG. 6 in order to allow the failed master to come up as a slave or halt in its diagnostics checks. If the problem is with the slave processor, the master processor sets its control ID to stand-alone mode and returns to step 701.

Figure 8:
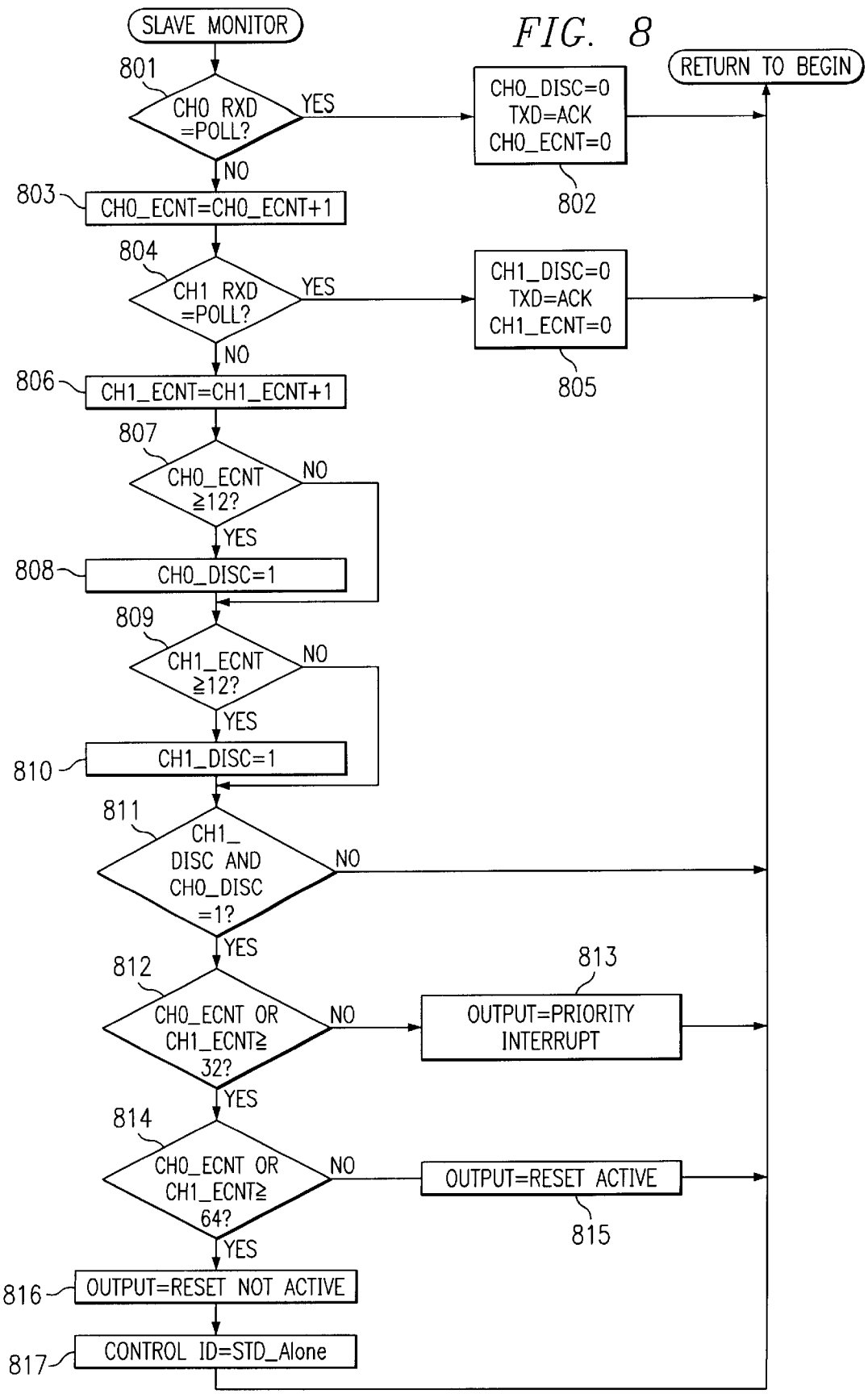
FIG. 8 depicts a flowchart illustrating the operation of a processor in slave mode in accordance with the present invention.

Referring to FIG. 8, a flowchart illustrating the operation of a processor in slave mode is depicted in accordance with the present invention. When a processor begins running in slave mode, it first checks Ethernet channel 0 for incoming polling from the other (master) processor (step 801). If polling is received on channel 0, the channel 0 error count and channel 0 discount are left unchanged, and an acknowledge message is sent back to the master controller (step 802). If polling is not received on Ethernet channel 0, the error count is increased by a value of 1 (step 803), and Ethernet channel 1 is checked for polling (step 804). If polling is received via channel 1, the error count and channel discount values are not changed and an acknowledge message is sent back to the master controller (step 805). However, if polling is not received by channel 1, the channel 1 error count is increased by a value of 1 (step 806).

If polling has not been received by either Ethernet channel 0 or channel 1, the (slave) processor next determines if the preset maximum error count (e.g., 12) has been reached for Ethernet channel 0 (step 807). If the maximum has been reached, the channel 0 discount value is set to 1 (step 808), and then checks if the maximum error count for Ethernet channel 1 has been reached (step 809). If the maximum error count for channel 0 has not been reached, the processor proceeds directly to step 809. If the preset maximum error count for Ethernet channel 1 has been reached, the channel 1 discount value is set to 1 (step 810). After the error counts for both Ethernet channels 0 and 1 have been compared with the preset maximum, the processor determines if both channels have been discounted (step 811). If both channels have not been discounted, the processor continues running on the single working channel and returns to Begin in FIG. 7.

If both Ethernet channels have been discounted, the processor determines if the error count of either channel 0 or 1 has reached a second preset error value (e.g., 32) (step 812). If neither channel has reached this second error count, the failed slave processor sends out a Priority Interrupt (step 813) and returns to Begin in FIG. 7. The priority interrupt alerts the master processor that a reset and switchover will occur if the master does not take corrective action.

If either of the Ethernet channels has reached or surpassed the second preset error count limit in step 812, this indicates that the master processor has not taken corrective action, and the slave processor checks if either channel has reached a third preset error count (e.g., 64) (step 814).

If neither channel has reached the third preset error count in step 814, the slave processor initiates a reset and switchover by sending out a Reset Active, which resets the failed master processor (step 815). The slave processor then returns to Begin in FIG. 7. If the master processor has been reset, it will normally "stand down" and allow the slave to take over as the new master.

If either channel 0 or channel 1 has reached the third preset error count in step 814, this indicates that the reset on the master processor has not been successful. In this event, the slave processor sends out a Reset Not Active (step 816), then switches over to stand-alone mode (step 817) and returns to Begin in FIG. 7. The Reset Not Active deactivates the reset on the former master processor, so that this processor is not left in reset indefinitely.

Figure 9:
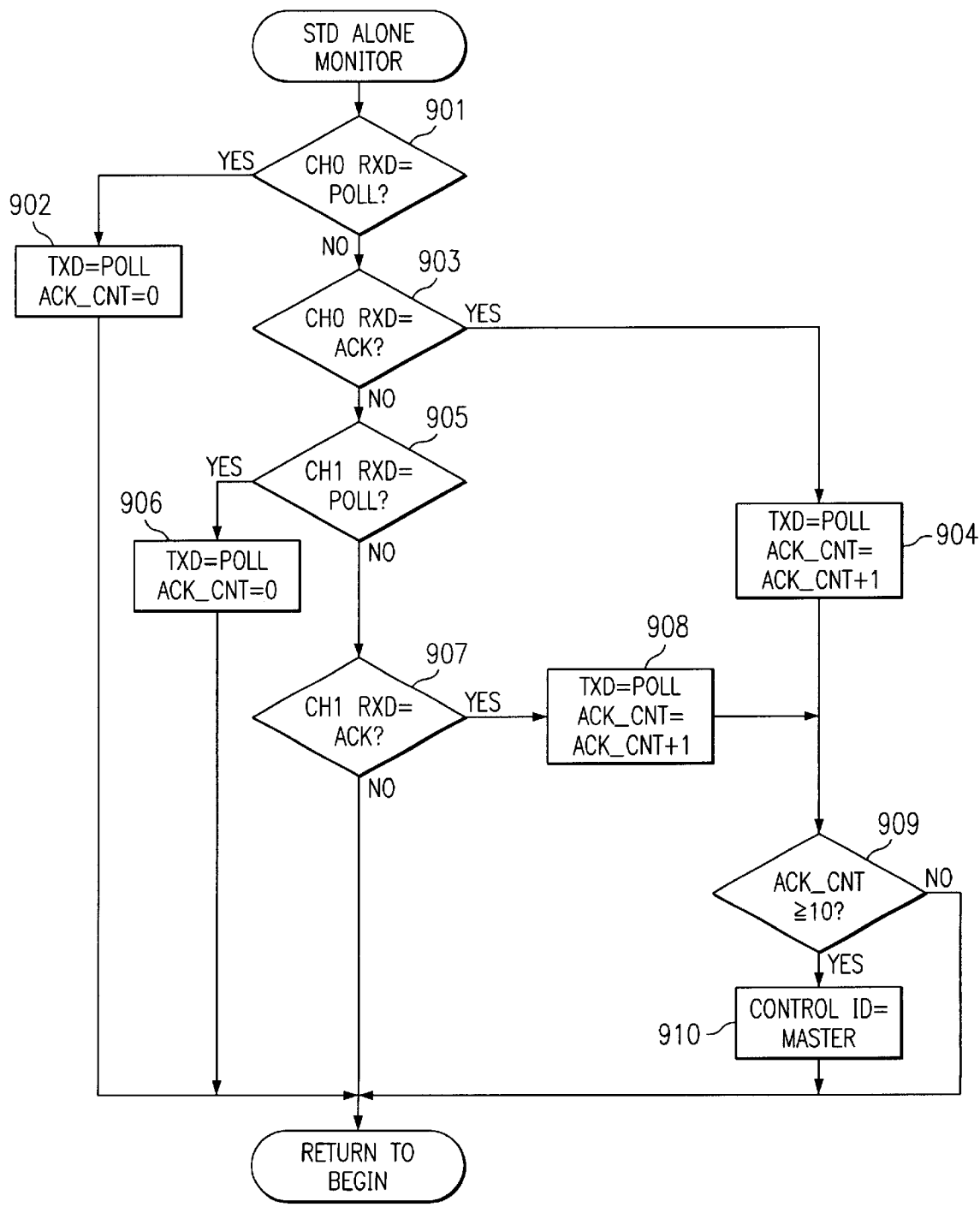
FIG. 9 depicts a flowchart illustrating the operation of a processor in stand-alone mode in accordance with the present invention.

Referring to FIG. 9, a flowchart illustrating the operation of a processor in stand-alone mode is depicted in accordance with the present invention. A processor operating in stand-alone mode monitors the Ethernet channels for another processor, and will assert itself as the master processor if another processor is detected. However, unlike master and slave mode, a stand-alone processor does not register errors if another processor is not detected.

The stand-alone processor first checks Ethernet channel 0 for incoming polling (step 901). If polling is detected, the processor sends out its own polling in response (step 902) and returns to Begin in FIG. 7. The acknowledge count (ACK_CNT) is maintained at 0, because no acknowledgements were received.

If polling is not received on channel 0, the processor determines if an acknowledge message has been received by channel 0 (step 903). If an acknowledge message is received, a poll message is sent back and the acknowledge count is increased by a value of 1 (step 904). The processor then determines if a preset number of acknowledge counts have been received (step 909). If the preset limit has not been reached, the processor returns to Begin in FIG. 7. If the preset number of acknowledge messages in step 909 has been reached, the control ID is set to master mode (step 910), and the processor returns to Begin in FIG. 7.

If no acknowledge messages are received by Ethernet channel 0, the processor then checks if channel 1 has received any polling (step 905). If channel 1 has received a poll, the processor sends out its own polling, attempting to assert itself as the master processor, (step 906) and returns to Begin in FIG. 7. The acknowledge count (ACK_CNT) is maintained at 0, because no acknowledgements were received.

If channel 1 has not received a poll, the processor checks if channel 1 has received an acknowledgement (step 907). If channel 1 has not received any acknowledge messages, the processor returns to Begin in FIG. 7. If channel 1 has received an acknowledge message, the processor sends out a poll and increases the acknowledge count by a value of 1 (step 908). The processor then determines if a preset number of acknowledge counts have been received (step 909). If the reset limit has not been reached, the processor returns to Begin in FIG. 7. If the preset number of acknowledge messages in step 909 has been reached, the control ID is set to master mode (step 910), and the processor returns to Begin in FIG. 7.

Customers are now demanding continuous operation of library equipment (i.e. 24 hours/day, 7 days/week). The present invention allows the automated storage library to meet this demand.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for providing control mechanism redundancy, the method comprising:

initiating a first control unit, wherein the first control unit executes input/output (I/O) for at least one robotic device;

initiating a second control unit, wherein the second control unit is subordinate to the first control unit and monitors I/O for the robotic device;

wherein the first and second control units operate in tandem and monitor each other's status by means of at least one communication channel between the first and second control units; and if the first control unit fails to respond to a specified number of status inquires sent by the second control unit, allowing the second control unit to assume responsibility for I/O for the robotic device.

2. The method according to claim 1, wherein the step of allowing the second control unit to assume responsibility for I/O further comprises:

sending a priority interrupt to the first control unit, wherein the interrupt alerts the first control unit that the second control unit will take over execution of I/O and initiate a reset of the first control unit, unless the first control unit takes corrective action and overcomes the failure.

3. The method according to claim 2, wherein if the first control unit takes corrective action and overcomes the failure:

allowing the first control unit to continue executing I/O for the robotic device.

4. The method according to claim 2, wherein if the first control unit does not take corrective action and overcome the failure:

resetting the first control unit; and allowing the second control unit to take over execution of I/O for the robotic device.

5. The method according to claim 4, wherein if reset of the first control unit is successful, the first control unit becomes subordinate to the second control unit.

6. The method according to claim 4, wherein if reset of the first control unit is unsuccessful:

deactivating the first control unit; and setting the second control unit to stand-alone mode, wherein the second control unit passively monitors for the presence of other control units and assigns subordinate status to any new control unit that is detected.

7. The method according to claim 1, wherein if the second control unit fails to respond to a specified number of status inquires sent by the first control unit, while the second control unit is still subordinate to the first control unit:

setting the first control unit to operate in standalone mode, wherein the first control unit passively monitors for the presence of other control units and assigns subordinate status to any new control unit that is detected.

8. The method according to claim 1, wherein the redundancy provides backup support for control mechanisms in a data storage library.

9. A computer program product in a computer readable medium for use in a data processing system, for providing control mechanism redundancy, the computer program product comprising:

instructions for initiating a first control unit, wherein the first control unit executes input/output (I/O) for at least one robotic device;

instructions for initiating a second control unit, wherein the second control unit is subordinate to the first control unit and monitors I/O for the robotic device;

wherein the first and second control units operate in tandem and monitor each other's status by means of at least one communication channel between the first and second control units; and instructions for allowing the second control unit to assume responsibility for I/O for the robotic device if the first control unit fails to respond to a specified number of status inquires sent by the second control unit.

10. The computer program product according to claim 9, wherein the instructions for allowing the second control unit to assume responsibility for I/O further comprise:

instructions for sending a priority interrupt to the first control unit, wherein the interrupt alerts the first control unit that the second control unit will take over execution of I/O and initiate a reset of the first control unit, unless the first control unit takes corrective action and overcomes the failure.

11. The computer program product according to claim 10, wherein if the first control unit takes corrective action and overcomes the failure:

instructions for allowing the first control unit to continue executing I/O for the robotic device.

12. The computer program product according to claim 10, wherein if the first control unit does not take corrective action and overcome the failure:

instructions for resetting the first control unit; and instructions for allowing the second control unit to take over execution of I/O for the robotic device.

13. The computer program product according to claim 12, wherein if reset of the first control unit is successful, the first control unit becomes subordinate to the second control unit.

14. The computer program product according to claim 12, wherein if reset of the first control unit is unsuccessful:

instructions for deactivating the first control unit; and instructions for setting the second control unit to stand-alone mode, wherein the second control unit passively monitors for the presence of other control units and assigns subordinate status to any new control unit that is detected.

15. The computer program product according to claim 9, wherein if the second control unit fails to respond to a specified number of status inquires sent by the first control unit, while the second control unit is still subordinate to the first control unit:

instructions for setting the first control unit to operate in stand-alone mode, wherein the first control unit passively monitors for the presence of other control units and assigns subordinate status to any new control unit that is detected.

16. The computer program product according to claim 9, wherein the redundancy provides backup support for control mechanisms in a data storage library.

17. A system for providing control mechanism redundancy, the system comprising:

a first control unit, wherein the first control unit executes input/output (I/O) for at least one robotic device;

a second control unit, wherein the second control unit is subordinate to the first control unit and monitors I/O for the robotic device;

wherein the first and second control units operate in tandem;

at least one communication channel between the first and second control units, whereby the first and second control units monitor each other's status; and a switchover mechanism which allows the second control unit to assume responsibility for I/O for the robotic device if the first control unit fails to respond to a specified number of status inquires sent by the second control unit.

18. The system according to claim 17, wherein the redundancy provides backup support for control mechanisms in a data storage library.

* * * * *